Patented Feb. 6, 1923.

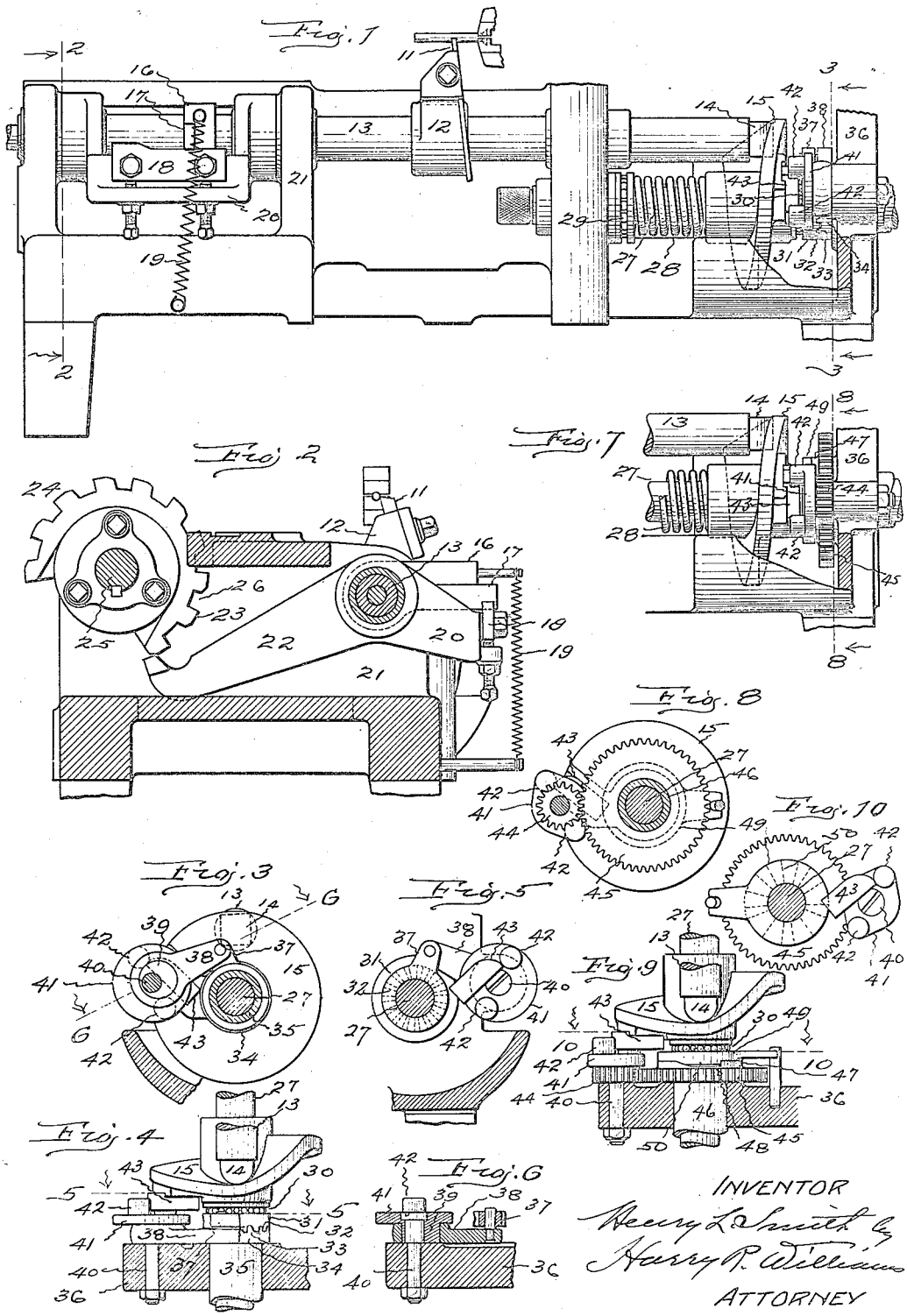

1,444,433

UNITED STATES PATENT OFFICE.

HENRY L. SMITH, OF WATERBURY, CONNECTICUT, ASSIGNOR TO THE E. J. MANVILLE MACHINE COMPANY, OF WATERBURY, CONNECTICUT, A CORPORATION OF CONNECTICUT.

TOOL-FEED MECHANISM FOR WOOD-SCREW MACHINES.

Application filed January 3, 1922. Serial No. 526,496.

*To all whom it may concern:*

Be it known that I, HENRY L. SMITH, a citizen of the United States, residing at Waterbury, in the county of New Haven and State of Connecticut, have invented a new and useful Improvement in Tool-Feed Mechanism for Wood-Screw Machines, of which the following is a specification.

This invention relates to those machines which are designed to cut a plurality of threads on screw blanks. In automatic wood screw machines the thread cutting tools are fed and returned along each blank several times. At the end of each feed the cutting edge of the tools are turned out from the blank so that they may be returned for the next cut. After each return the cutting edges are turned in toward the axis of the blank slightly further than during the previous forward feed so as to increase the depth of the cuts. The tool feed and return movements are controlled by feed cams, the contours of the cuts are controlled by profile cams, and the depths of the cuts are controlled by depth cams acting through the profile cams.

The object of the present invention is to so design the tool controlling mechanisms of a screw machine of this class that two threads may be cut by a single threading tool controlled by a single feed cam, a single profile cam and a single depth cam, the two thread cuts starting on diametrically opposite sides of the blank at the same distance from the point.

To accomplish this with one tool, in the embodiment of the invention illustrated, the rotatory feed cam is mounted on the feed cam shaft so as to have a bodily movement longitudinally thereof after every return of the tool, whereby after one return the tool commences to cut at one locality and after the next return it commences to cut at another point, thus alternating in making the two thread cuts.

In the accompanying drawings Figure 1 shows a front elevation of so much of a wood screw machine as is necessary to an understanding of the present invention. Fig. 2 shows a vertical section of the mechanism taken on the plane indicated by the dotted line 2—2 on Fig. 1. Fig. 3 shows a vertical section on the dotted line 3—3 on Fig. 1. Fig. 4 shows a plan of the feed cam and the means for advancing and returning it on the feed cam shaft. Fig. 5 is a vertical section on the dotted line 5—5 on Fig. 4. Fig. 6 is a section on the dotted line 6—6 on Fig. 3. Fig. 7 shows a front elevation of the feed cam and a modified form of means for advancing and returning it on the feed cam shaft. Fig. 8 is a vertical section on the plane indicated by the dotted line 8—8 on Fig. 7. Fig. 9 is a plan of the feed cam and the modified form of controlling mechanism. Fig. 10 is a section on the dotted line 10—10 on Fig. 9.

In the machine illustrated the threading tool 11 is clamped in a holder 12 that is fastened to the feed shaft 13. Fixed to one end of the feed shaft is a shoe 14 that is held by suitable means in engagement with the feed cam 15 which is of common outline and is rotated by the usual mechanism.

Fastened to the feed shaft is a rocker arm 16 that at its forward end has a shoe 17 which is held in engagement with the edge of the profile cam 18 by a spring 19. The profile cam is adjustably fastened to the front of a yoke-shaped saddle 20 which is pivotally mounted in the frame 21 concentric with the feed shaft. Projecting rearwardly from the saddle is a lever 22 the end of which is successively engaged by the surfaces 23 of the cut or depth cam 24 that is mounted on the cam shaft 25. The cut cam illustrated is of the type described in United States Letters Patent #1,196,308 granted on my application August 29th 1916. When the end of the lever is engaged by one of the cam surfaces the saddle is swung so as to rock the feed shaft and turn the tool in toward the screw blank. The parts are so timed that the end of the lever drops into one of the spaces 26 allowing the tool to be drawn away from the screw blank as the return movement of the tools is being effected. Each succeeding projection of the cam is higher than the preceding projection in order that the cut be deeper after each return movement, as set forth in the above mentioned patent.

The feed cam is mounted on the feed cam shaft 27 to rotate therewith but have a longitudinal movement thereon. A spring 28 is placed on the shaft between an anti-friction thrust bearing 29 and the hub of the cam so as to push the cam back on the shaft against an anti-friction bearing 30. Rotatably mounted on the feed cam shaft back of the bearing 30 is a collar 31 that has ratchet teeth 32. Engaging with these teeth are ratchet teeth 33 on a collar 34 that is fastened to a bushing 35 which is fixed in the frame 36 about the feed cam shaft. Projecting from the rotatable collar 31 is an arm 37 which is pivotally connected with an arm 38 that is mounted on an eccentric 39. The eccentric turns on a stud 40 fastened in the frame and it is attached to a disk 41 which has two pins 42 that project into the path of a cam block 43 which is fastened to the back of the feed cam. The cam block 43 during the revolution of the feed cam engages one of the pins 42 and turns the eccentric half way around and this through the eccentric arm turns the rotatable toothed collar 31 on the feed cam shaft. When the loose collar is turned one way by the eccentric its teeth ride up on the teeth of the fixed collar 34 and this forces the feed cam forward. When the loose collar is turned in the opposite direction its teeth move back into the spaces between the teeth of the fixed collar and the feed cam is pushed back by the spring on the feed cam shaft.

These mechanisms so co-act that during or after one return movement of the tool the feed cam is advanced and during or after the next return movement of the tool the feed cam is pushed back, so that every alternate forward feed of the tool affected by the rotation of the feed cam commences back of the point where the intermediate forward feeds of the tool caused by the rotation of the cam commence. This distance is substantially equal to the distance between the two threads to be cut and thereby one forward feed of the tool follows one thread groove in cutting and the next forward feed of the tool follows the other thread groove in cutting. The cut or depth cam is constructed as usual but in this case it has twice the common number of notches and cam surfaces, and the notches are so shaped that the tool is not swung up into engagement with the screw blank when the feed cam is back until the cam has begun to feed the tool and the blank has made one-half of a revolution. By this arrangement the two threads are cut with a single tool and the threads will start on diametrically opposite sides of the blank at the same distance from the point.

The cam shaft and feed cam shaft illustrated may be rotated by mechanism similar to that described in United States Letters Patent #1,170,694 granted on my application February 8th, 1916.

In the modified construction illustrated instead of rotating the loose toothed collar for advancing and returning the feed cam, by means of an eccentric as above described, the disk bearing the pins which are engaged by the cam block on the back of the feed cam may be fastened to a pinion 44 which may be meshed with a gear 45 fastened to a sleeve 46 that is rotarily mounted in the frame on the feed cam shaft. Fastened to this gear is a collar 47 with recesses 48. Held from rotation on the feed cam shaft is a collar 49 with teeth 50. When, during the rotation of the feed cam, the block which it carries engages one of the pins and causes the rotation of the pinion and gear, the collar 47 is turned with relation to the collar 49 so that at one time the teeth of the latter are in the notches of the former and the feed cam is pushed back by the spring. At another time the teeth of the collars ride upon each other and the feed cam is pushed forward. These parts are so timed that the feed cam is moved back and forward at the same periods as previously described for the purpose of causing the tool to cut first in one of the thread grooves and then in the other of the thread grooves in order to form the two threads.

The invention claimed is:—

1. In a screw machine the combination with a threading tool movable back and forth longitudinally and transversely of the blank to be threaded, of means for feeding the tool longitudinally, means for changing the locality of said feeding means between each feed of the tool, and means for feeding the tool transversely.

2. In a screw machine the combination with a threading tool movable back and forth longitudinally and transversely of the blank to be threaded, of means for feeding the tool longitudinally, means for increasing the length of each alternate feed and decreasing the length of each intermediate feed, and means for feeding the tool transversely.

3. In a screw machine the combination with a threading tool movable back and forth longitudinally and transversely of the blank to be threaded, of means for feeding the tool longitudinally, means operatively connected with the feeding means for changing the locality of the feeding means before each feed of the tool, and means for feeding the tool transversely.

4. In a screw machine the combination with a threading tool movable back and forth longitudinally and transversely of the blank to be threaded, of a cam for feeding the tool longitudinally, means for changing the locality of the cam before each feed of the tool, and means for feeding the tool transversely.

5. In a screw machine the combination with a threading tool movable back and forth longitudinally and transversely of the blank to be threaded, of a cam for feeding the tool longitudinally, means for sliding the cam back and forth in a line with the feed of the tool, means mounted on the feed cam for operating the position changing means, and means for feeding the tool transversely.

6. In a screw machine the combination with a threading tool movable back and forth longitudinally and transversely of the blank to be threaded, of a cam for feeding the tool longitudinally, said cam being mounted to rotate and to move back and forth in a line with the feed of the tool, engaging surfaces adapted to move the feed cam in a line with the feed of the tool, an eccentric for operating said co-acting surfaces, means on the feed cam for actuating said eccentric, and means for feeding the tool transversely.

7. In a screw machine the combination with a threading tool movable back and forth longitudinally and transversely of the blank to be threaded, of means for feeding the tool longitudinally, means for alternately advancing and retracting said feeding means between each feed of the tool, and means for feeding the tool transversely.

8. In a screw machine the combination with a threading tool movable back and forth longitudinally and transversely of the blank to be threaded, of a cam for feeding the tool longitudinally, means for alternately advancing and retracting the cam before each feed of the tool, and means for feeding the tool transversely.

9. In a screw machine the combination with a threading tool movable back and forth longitudinally and transversely of the blank to be threaded, of a cam for feeding the tool longitudinally, said cam being mounted to rotate and to move back and forth in a line with the feed of the tool, co-acting toothed surfaces adapted to move the feed cam in a line with the feed of the tool, means actuated from the feed cam for operating said co-acting surfaces, and means for feeding the tool transversely.

10. In a screw machine the combination with a threading tool movable back and forth longitudinally of the blank to be threaded, of means for feeding the tool longitudinally, and means operatively connected with the feeding means for changing the locality of the feeding means before each feed of the tool.

11. In a screw machine the combination with a threading tool movable back and forth longitudinally of the blank to be threaded, of a cam for feeding the tool longitudinally, means for sliding the cam back and forth in a line with the feed of the tool, and means mounted on the feed cam for operating said position changing means.

12. In a screw machine the combination with a threading tool movable back and forth longitudinally of the blank to be threaded, of means for feeding the tool longitudinally, and means for increasing the length of each alternate feed and decreasing the length of each intermediate feed.

HENRY L. SMITH.